United States Patent
Won

(10) Patent No.: US 11,359,788 B2
(45) Date of Patent: Jun. 14, 2022

(54) HEAD LAMP SYSTEM FOR VEHICLE AND OPERATING METHOD THEREOF

(71) Applicant: HYUNDAI MOBIS CO., LTD., Seoul (KR)

(72) Inventor: Yong Hee Won, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/116,226

(22) Filed: Dec. 9, 2020

(65) Prior Publication Data
US 2022/0136674 A1    May 5, 2022

(30) Foreign Application Priority Data
Nov. 4, 2020 (KR) .......................... 10-2020-0146362

(51) Int. Cl.
| | |
|---|---|
| F21S 41/675 | (2018.01) |
| B60Q 1/08 | (2006.01) |
| B60Q 1/00 | (2006.01) |
| F21S 41/33 | (2018.01) |
| F21W 102/20 | (2018.01) |

(52) U.S. Cl.
CPC .......... F21S 41/675 (2018.01); B60Q 1/0023 (2013.01); B60Q 1/085 (2013.01); F21S 41/33 (2018.01); B60Q 2300/32 (2013.01); F21W 2102/20 (2018.01)

(58) Field of Classification Search
CPC .................................................... F21S 41/675
See application file for complete search history.

(56) References Cited

U.S. PATENT DOCUMENTS

| | | | |
|---|---|---|---|
| 5,938,319 A * | 8/1999 | Hege | F21S 41/321 362/459 |
| 7,684,007 B2 | 3/2010 | Hull et al. | |
| 10,107,467 B2 * | 10/2018 | Bhakta | F21S 41/176 |
| 10,179,534 B2 * | 1/2019 | Hoshino | F21S 41/336 |
| 2008/0175012 A1 | 7/2008 | Shimaoka | |
| 2014/0071706 A1 * | 3/2014 | Yagi | F21S 41/645 362/520 |

FOREIGN PATENT DOCUMENTS

| | | |
|---|---|---|
| DE | 102015012022 | 3/2017 |
| DE | 102017200781 | 7/2018 |
| DE | 102017223439 | 6/2019 |

(Continued)

OTHER PUBLICATIONS

German Office Action dated Jul. 19, 2021 issued in German Application No. 10 2020 134 457.0.

(Continued)

*Primary Examiner* — Robert J May
(74) *Attorney, Agent, or Firm* — DLA Piper LLP (US)

(57) ABSTRACT

The present disclosure relates to a head lamp system of a vehicle and an operating method thereof, and includes a vehicle sensor for detecting driving situations of a vehicle, a first Digital Micro mirror Device (DMD) module and a second DMD module that include a plurality of micromirrors, and a module controller for controlling the plurality of micro-mirrors included in the first and second DMD modules based on signals provided from the vehicle sensor.

7 Claims, 7 Drawing Sheets

(56) References Cited

FOREIGN PATENT DOCUMENTS

| JP | 2016-008043 | 1/2016 |
| KR | 10-0528469 B1 | 11/2005 |
| KR | 10-2017-0079898 A | 7/2017 |
| KR | 10-1859201 B1 | 5/2018 |
| KR | 10-1908309 | 10/2018 |
| KR | 10-2020-0016525 A | 2/2020 |
| KR | 10-2020-0022503 A | 3/2020 |
| KR | 2020-0048611 | 5/2020 |
| WO | WO 2017/214648 | 12/2017 |

OTHER PUBLICATIONS

Korean Office Action dated Feb. 3, 2022 issued in Korean Application No. 10 2020 0146362.

* cited by examiner

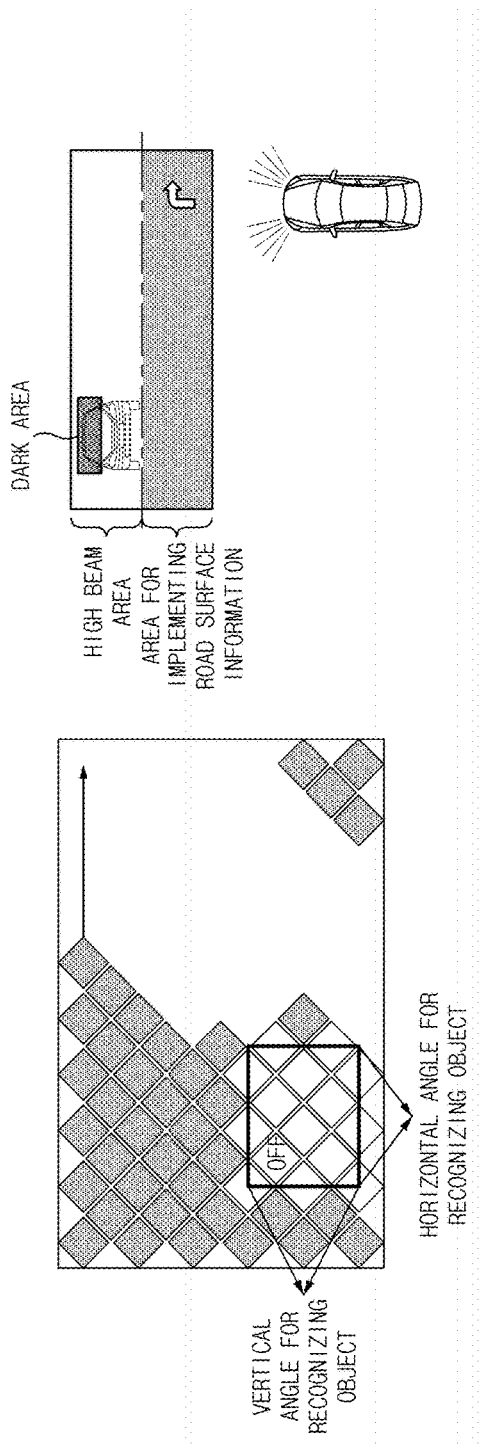
Fig.3A
Fig.3B
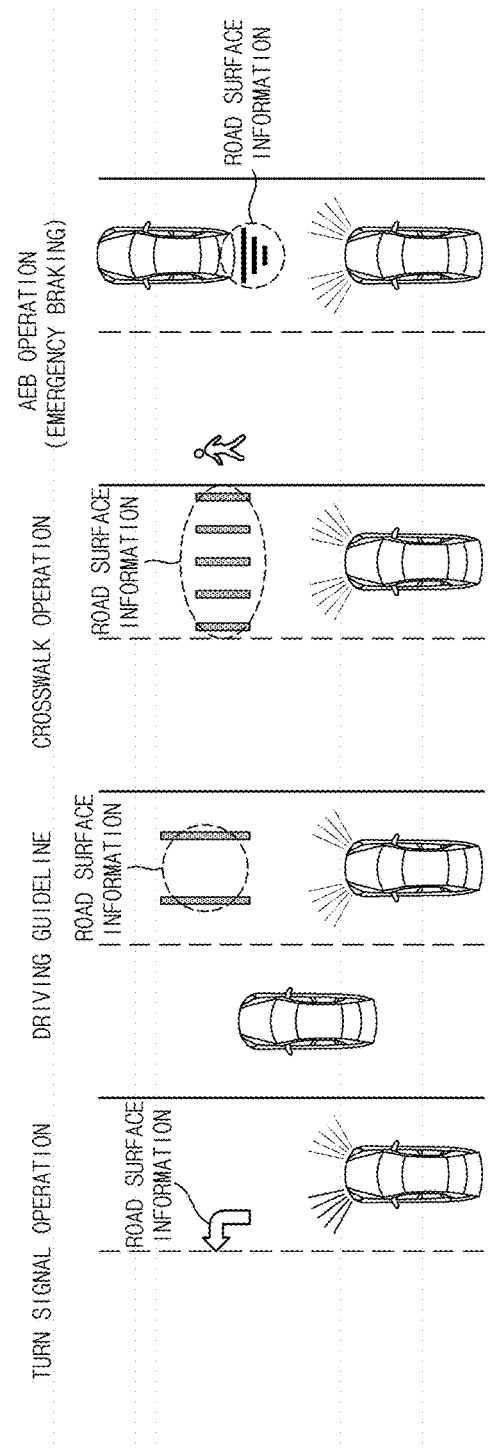
Fig.3C

HEAD LAMP SYSTEM FOR VEHICLE AND OPERATING METHOD THEREOF

CROSS-REFERENCE TO RELATED APPLICATION

This application claims the benefit of priority to Korean Patent Application No. 10-2020-0146362, filed in the Korean Intellectual Property Office on Nov. 4, 2020, the entire contents of which are incorporated herein by reference.

TECHNICAL FIELD

The present disclosure relates to a head lamp system of a vehicle and an operating method thereof.

BACKGROUND

In general, a vehicle is equipped with a lighting device to allow a driver to see objects in a driving direction at night and to inform other vehicles or users on other roads of the driving status of the vehicle.

A head lamp, which is also called a head light, is lighting that illuminates a path in front of the vehicle, and thus there is a need for brightness capable of identifying obstacles on a road at a distance of 100 m ahead at night.

The head lamp of the vehicle irradiates light to the front of the vehicle. In this way, the head lamp of the vehicle is one of the safety devices that prevent accidents by securing a wide front view of a driver. Beam patterns implemented through the head lamp include a low beam mode, a high beam mode, an adaptive driving beam (ADB) mode, and the like.

The ADB mode is a type of a beam pattern implemented in an intelligent head lamp, and refers to a mode in which the direction and angle of light is automatically adjusted depending on driving situations. The ADB mode refers to a technology that automatically switches a high beam mode and a low beam mode by detecting the preceding vehicle through a camera sensor. At this time, the ADB mode refers to a technology that prevents a driver of the other vehicle from causing glare, by switching to a low beam mode or forming a shadow zone when a preceding vehicle appears while a vehicle operates in a high beam mode at a normal time.

However, in the case of the conventional ADB, the technology of recognizing a forward vehicle and forming a shadow zone (dark area) may reduce the visibility of a driver because the shadow zone is wide by a method of turning on/off LED.

SUMMARY

The present disclosure has been made to solve the above-mentioned problems occurring in the prior art while advantages achieved by the prior art are maintained intact.

An aspect of the present disclosure provides a head lamp system for a vehicle capable of improving a driver's visibility as well as reducing the glare of a counterpart driver by minimizing a dark area, and an operating method thereof.

Furthermore, an aspect of the present disclosure provides a head lamp system for a vehicle capable of implementing a communication function between a driver and a user (a counterpart driver, pedestrian, bicycle, or the like) on another road to improve convenience and safety, by implementing an image depending on driving situations on a road surface, and an operating method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a head lamp system for a vehicle may include a vehicle sensor for detecting driving situations of a vehicle, a first Digital Micro mirror Device (DMD) module and a second DMD module that include a plurality of micro-mirrors, and a module controller for controlling the plurality of micro-mirrors included in the first and second DMD modules based on signals provided from the vehicle sensor.

In an embodiment, each of the first and second DMD modules may include a light source for emitting light, the plurality of micro-mirrors for reflecting the emitted light from the light source, and an optical system that receives light reflected from the plurality of micro-mirrors to generate a light distribution pattern.

In an embodiment, each of the plurality of micro-mirrors may form the light distribution pattern by rotating to reflect the light emitted from the light source to the optical system, under control of the module controller, or may generate a dark area by rotating not to enter the light emitted from the light source into the optical system.

In an embodiment, the module controller may control some of the plurality of micro-mirrors to reflect light to the optical system, and may control the remaining plurality of micro-mirrors not to reflect light.

In an embodiment, the module controller may change a size of the dark area included in a high beam by increasing or decreasing the number of micro-mirrors, which do not reflect light to the optical system, from among the plurality of micro-mirrors.

In an embodiment, the module controller may change a horizontal size of the dark area by increasing or decreasing the number of micro-mirrors in a horizontal direction, which do not reflect light to the optical system, from among the plurality of micro-mirrors.

In an embodiment, the module controller may change a vertical size of the dark area by increasing or decreasing the number of micro-mirrors in a vertical direction, which do not reflect light to the optical system, from among the plurality of micro-mirrors.

In an embodiment, the module controller may select road surface information according to the driving situations based on the signals provided from the vehicle sensor, and may control the first and second DMD modules to implement an image according to the selected road surface information on the road surface.

In an embodiment, the module controller may control only a micro-mirror of a location corresponding to an image to be implemented on the road surface among the plurality of micro-mirrors such that light reflected to the optical system is input, may control the remaining micro-mirrors such that the light reflected to the optical system is not input, and may implement an image of the road surface information on the road surface.

In an embodiment, the module controller may set a priority according to a predetermined weight based on the signals provided from the vehicle sensor, and may select the road surface information depending on the set priority.

According to another aspect of the present disclosure, an operating method of a head lamp system for a vehicle may include receiving and analyzing signals from a vehicle sensor, determining a location of an object based on analyzed information and setting a dark area for the determined location of the object, determining whether an output condition of a high beam is satisfied, emitting a beam pattern including the dark area in the high beam when the output condition of the high beam is satisfied, and again performing setting the dark area by increasing the number of the object when the number of the determined object is not a maximum number by determining the number of the determined object is the maximum number.

According to still another aspect of the present disclosure, an operating method of a head lamp system for a vehicle may include determining whether a low beam is operated, when a vehicle is started, implementing an image for inducing the low beam to be turned on, on a road surface when the low beam is not operated, implementing an image of a driving direction of the vehicle, as a guideline on the road surface when the low beam is operated, determining that a road surface information implementing situation occurs, based on signals provided from a vehicle sensor, stopping implementation of the guideline, and selecting an image according to the occurring road surface information implementing situation to implement the selected image on the road surface as road surface information when the situation of implementing road surface information occurs, and implementing the guideline on the road surface when the road surface information implementing situation is terminated.

In another embodiment, the implementing of the selected image as the road surface information may include implementing road surface information about a convenience function, implementing road surface information about a safety function, or implementing road surface information about a warning function, based on signals provided from the vehicle sensor.

In still another embodiment, the implementing of the selected image as the road surface information may include selecting one function among the convenience function, the safety function, and the warning function based on the signals provided from the vehicle sensor, selecting an image depending on a predetermined weight of the selected function, and forming the selected image as the road surface information on the road surface.

BRIEF DESCRIPTION OF THE DRAWINGS

The above and other objects, features and advantages of the present disclosure will be more apparent from the following detailed description taken in conjunction with the accompanying drawings:

FIGS. 3A, 3B and 3C are views for describing an operation of a DMD module included in a head lamp system for a vehicle according to an embodiment of the present disclosure;

DETAILED DESCRIPTION

Figure 1:
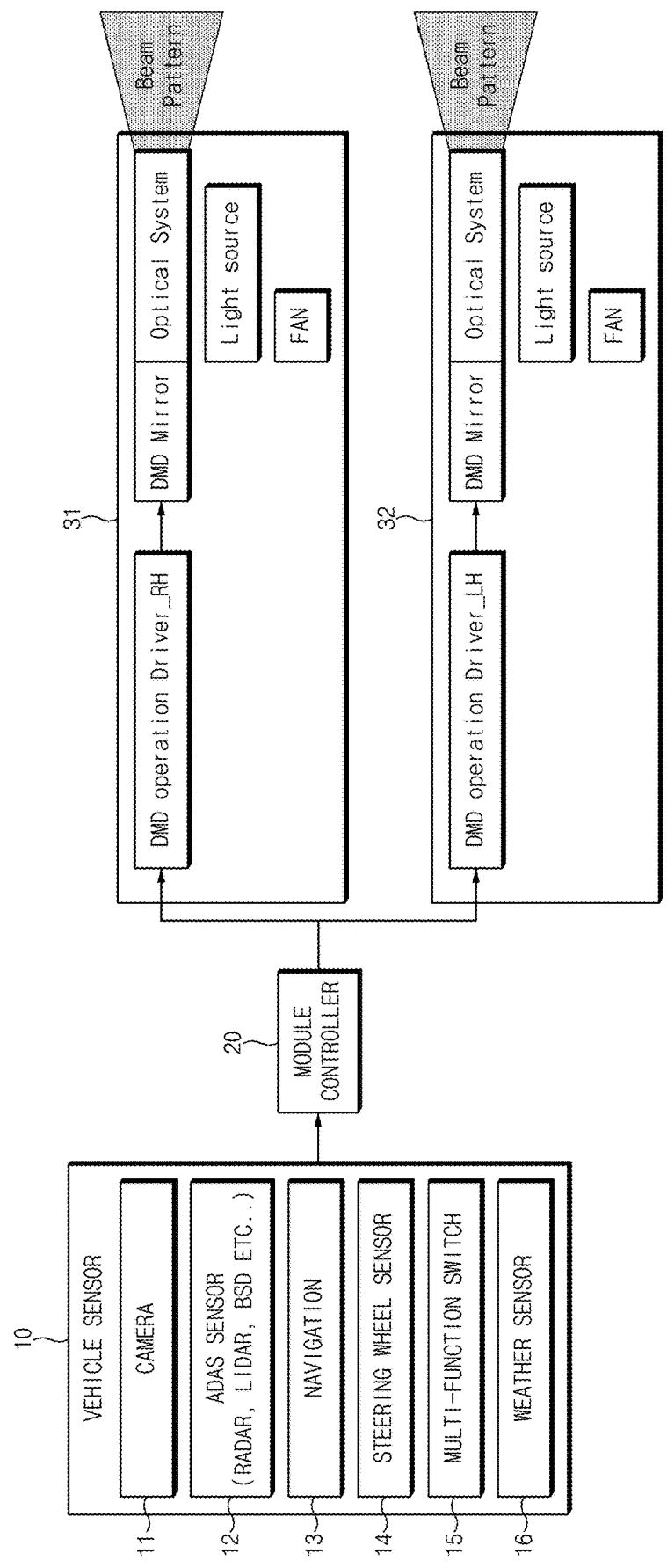
FIG. 1 is a block diagram illustrating a configuration of a head lamp system for a vehicle according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 7.

FIG. 1 is a block diagram illustrating a configuration of a head lamp system for a vehicle according to an embodiment of the present disclosure.

Referring to FIG. 1, the headlamp system for a vehicle according to an embodiment of the present disclosure may be implemented inside a vehicle. At this time, a module controller 20 may be integrally formed with internal control units of the vehicle; the autonomous driving control apparatus 100 may be implemented as a separate apparatus to be connected to the control units of the vehicle by a separate connection means.

Referring to FIG. 1, the head lamp system for a vehicle according to an embodiment of the present disclosure may include a vehicle sensor 10, the module controller 20, a first digital micro-mirror device (DMD) module 31 and a second DMD module 32. At this time, the first DMD module 31 may be disposed on the front right side of the vehicle, and the second DMD module 32 may be disposed on the front left side of the vehicle.

The vehicle sensor 10 may include sensors installed in the vehicle capable of determining driving situations of the vehicle.

For example, the vehicle sensor 10 may include a camera 11, an Advanced Driver Assistance Systems (ADAS) sensor 12 (e.g., LiDAR, radar, Blind Spot Detection (hereinafter, "BSD"), or the like), navigation 13, a steering wheel sensor 14, a multi-function switch 15, a weather sensor 16, and the like.

The vehicle sensor 10 may generate the location (horizontal/vertical angle information), ambient brightness, vehicle speed, the number of objects in front, weather information, steering information, ADAS signal, or the like of a vehicle for implementing a High Definition-Adaptive Driving Beam (HD-ADB) operation and road surface information, and may provide the generated information to the module controller 20.

The module controller 20 may generate an HD-ADB dark area image in real time by analyzing signals received from the vehicle sensor 10, may generate a road surface information image depending on preset implementation situations, and may selectively provide the HD-ADB dark area image and the road surface information image to the first and second DMD modules 31 and 32.

For example, the module controller 20 may generate the HD-ADB dark area image and the road surface information image for each of the front right-side and left-side of the vehicle, and may individually provide the generated images to the first and second DMD modules 31 and 32.

Furthermore, the module controller 20 may generate the HD-ADB dark area image and the road surface information image for the front of the vehicle, and may provide the generated images to the first and second DMD modules 31 and 32 at the same time.

Each of the first and second DMD modules 31 and 32 may be a high-definition optical module including DMD, and may include a light source emitting light in a visible region, and an optical system forming a light distribution pattern.

In addition, each of the first and second DMD modules 31 and 32 may include a single light source or a plurality of light sources. When the plurality of light sources are included, color expression may be possible. At this time, the type of the light source may include not only LEDs, but also halogen lamps, HID lamps, laser diodes, and the like. Besides, in each of the first and second DMD modules 31 and 32, the lens composition and quantity in the configuration of the optical system determining the field of view may be changed depending on the required specifications.

Each of the first and second DMD modules 31 and 32 may include a DMD operation driver, a DMD mirror, an optical system, a light source, and a fan.

The DMD operation driver included in each of the first and second DMD modules 31 and 32 may control the DMD mirror based on signals provided from the module controller 20.

Figure 2:
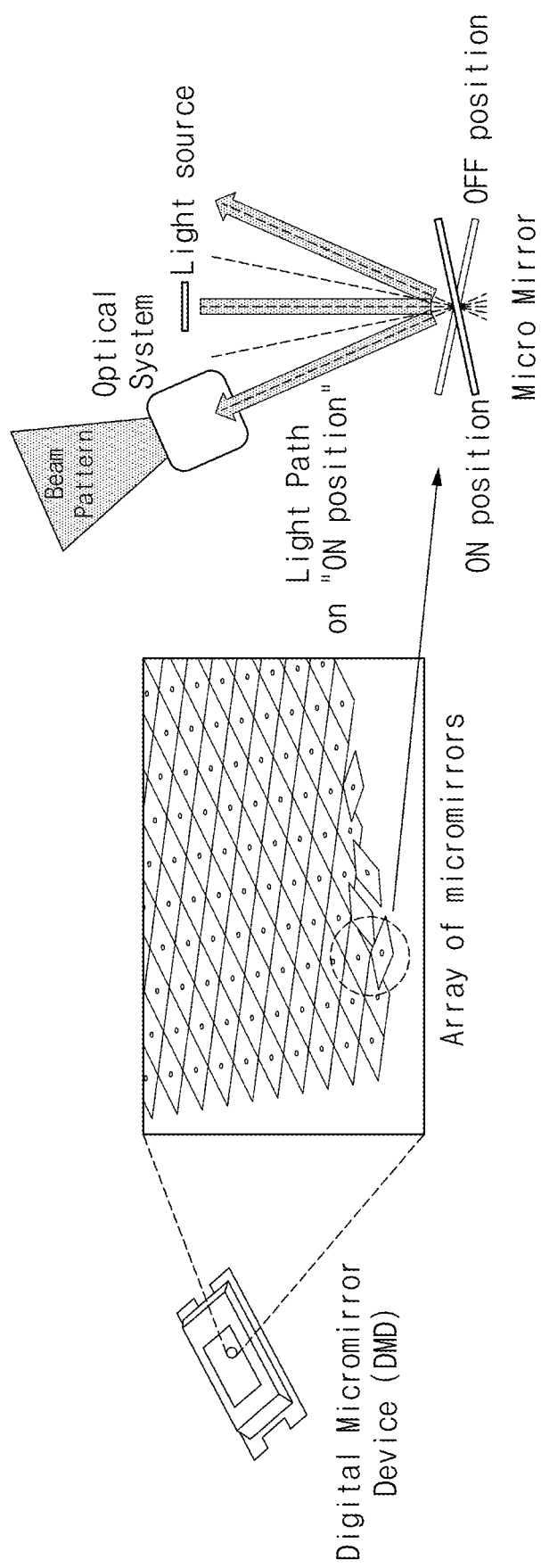
FIG. 2 is a view for describing a configuration of a DMD module included in a head lamp system for a vehicle according to an embodiment of the present disclosure.

FIG. 2 is a view for describing a configuration of a DMD module included in a head lamp system for a vehicle according to an embodiment of the present disclosure.

In particular, FIG. 2 is a view for describing the operation of a DMD mirror included in each of the first and second DMD modules 31 and 32.

Referring to FIG. 2, each of the first and second DMD modules 31 and 32 may include a DMD.

The DMD may include an array of micro-mirrors including a plurality of micro-mirrors.

The DMD operation driver may rotate each micro-mirror.

For example, when the DMD operation driver rotates the micro-mirror to the left and then reflects the light emitted from a light source to an optical system, a beam pattern may be formed; because the optical system does not emit light when the DMD operation driver rotates the micro-mirror to the right, a dark area may be formed.

When a forward vehicle is recognized while the vehicle is driving, the dark area may be formed by rotating the micro-mirrors in an area corresponding to the front vehicle to the right.

Moreover, the road surface information may be implemented by forming a dark area around an area where road surface information is implemented, and rotating a micro-mirror corresponding to the image of road surface information to be implemented to the left to emit light.

The first and second DMD modules 31 and 32 according to the embodiment of the present disclosure may be individually controlled, thereby forming different beam patterns on the right side and left side of the vehicle.

FIGS. 3A, 3B and 3C are views for describing an operation of a DMD module included in a head lamp system for a vehicle according to an embodiment of the present disclosure.

FIG. 3A illustrates an operation in which some of a plurality of micro-mirrors included in the array of micro-mirrors reflect light to an optical system, and the rest of the plurality of micro-mirrors do not reflect light to the optical system. In FIG. 3A, the area of the micro-mirrors that do not reflect light to the optical system is displayed as "OFF".

At this time, the micro-mirrors of the area displayed as "OFF" may form a dark area. Accordingly, the dark area formed by micro-mirrors may change the size of the dark area in the horizontal direction by increasing or decreasing the number of micro-mirrors that do not reflect light in the horizontal direction. Moreover, the dark area formed by micro-mirrors may change the size of the dark area in the vertical direction by increasing or decreasing the number of micro-mirrors that do not reflect light in the vertical direction.

FIG. 3B illustrates a beam pattern including a dark area. Because the head lamp system for a vehicle according to an embodiment of the present disclosure forms a beam pattern using a plurality of micro-mirrors, and forms a dark area using some of a plurality of micro-mirrors, the head lamp system for a vehicle may form a dark part in the desired area.

In addition, the head lamp system for a vehicle according to an embodiment of the present disclosure may form a dark area in a high beam area where a beam pattern is formed, while simultaneously forming a road surface information implementing area that implements road surface information on a road surface, and may change the size of the high beam area and the size of the road surface information implementing area depending on a driver's settings.

FIG. 3C illustrates that road surface information is implemented on a road surface. Several images as shown in FIG. 3C may be implemented on a road surface as road surface information by forming a dark area around an area where the road surface information is to be implemented, and reflecting light to the optical system using only the micro-mirrors corresponding to the image of the road surface information to be implemented.

Besides, the color of the image implemented on the road surface may be changed by changing the color of a light source.

Figure 4:
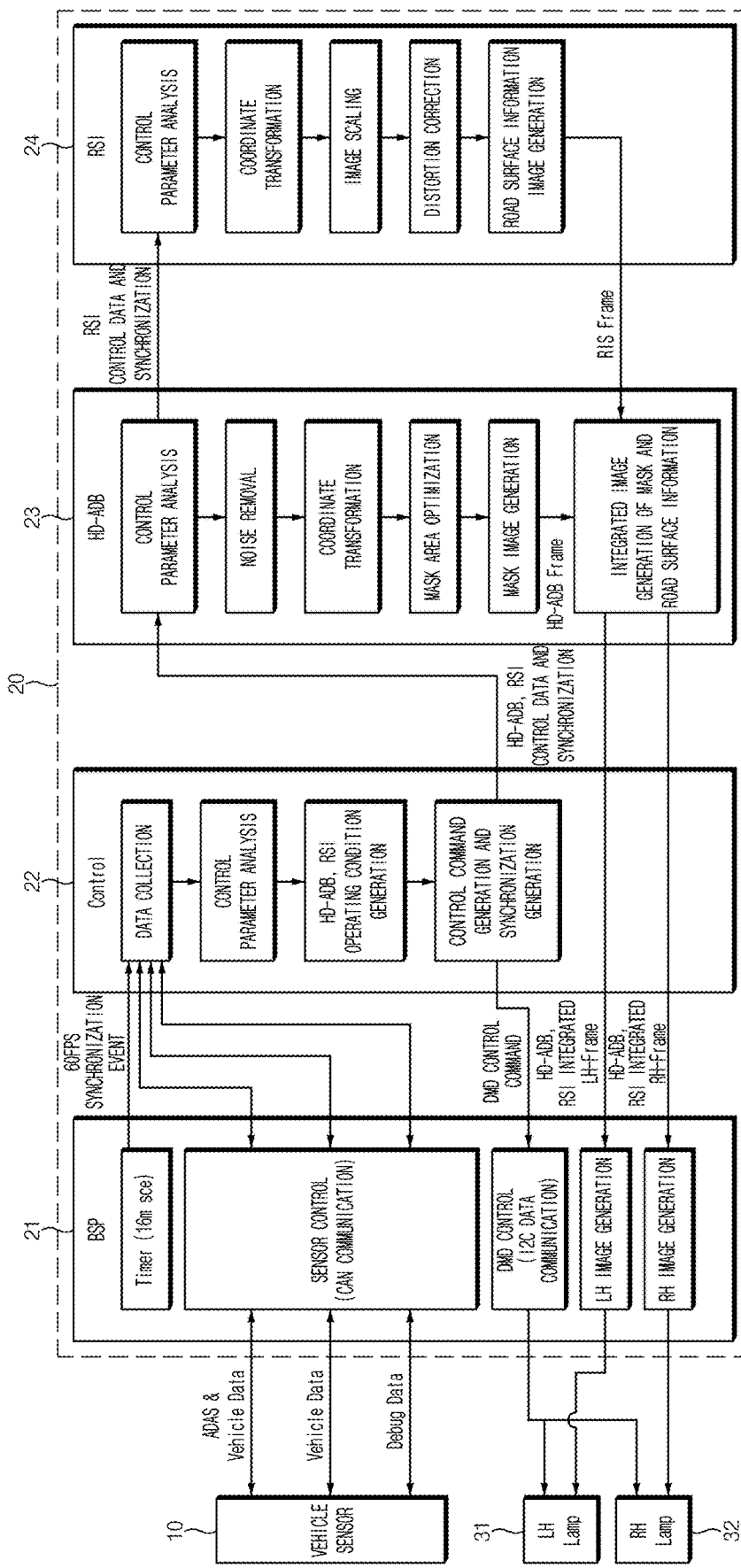
FIG. 4 is a view illustrating a configuration of a module controller included in a head lamp system for a vehicle according to an embodiment of the present disclosure.

FIG. 4 is a view illustrating a configuration of a module controller included in a head lamp system for a vehicle according to an embodiment of the present disclosure.

The module controller 20 may receive signals detected from the vehicle sensor 10 and may provide signals for generating a beam pattern to the first and second DMD modules 31 and 32.

The module controller 20 may include an interface 21, an image controller 22, a first image generator 23 and a second image generator 24.

The interface 21 may include a configuration for delivering a signal between the vehicle sensor 10 and the first and second DMD modules 31 and 32.

For example, the interface 21 may transmit and receive a signal using CAN communication with the vehicle sensor 10, and may transmit and receive a signal using I2C communication with the first and second DMD modules 31 and 32.

Furthermore, the interface 21 may provide the first and second DMD modules 31 and 32 with an image including a dark area and an image including road surface information.

In this case, the interface 21 may be implemented as a board support package (BSP).

For synchronization with the image controller 22, the interface 21 may provide a synchronization event signal to the image controller 22 at every preset time.

The interface 21 may control the vehicle sensor 10 and receive signals detected from the vehicle sensor 10, by transmitting and receiving signals through the CAN communication with the vehicle sensor 10.

The interface 21 may control the first and second DMD modules 31 and 32 through the I2C communication.

Besides, the interface 21 may receive at least one or more of an image including a dark area and an image including road surface information from the first image generator 23, may generate the at least one or more images as images of a type suitable for the first and second DMD modules 31 and 32, and may provide the first and second DMD modules 31 and 32 with the generated images.

The image controller 22 may receive signals delivered through the interface 21, and a synchronization event signal from the vehicle sensor 10, may synchronize the signals delivered from the vehicle sensor 10 with the synchronization event signal, and may obtain (collect) the synchronized signals as data.

The image controller 22 may analyze control parameters based on the obtained data, and may determine (generate) whether to generate a dark area in a beam pattern (HD-ADB operating condition), and whether to implement road surface information (RSI operating condition, road surface information).

When it is determined whether to generate a dark area, and whether to implement road surface information, the image controller 22 may generate control commands and data according to the determined conditions, and may synchronize the generated control command and data with the synchronization event signal to provide the synchronized control command and data to the first image generator 23 and the interface 21.

For example, the image controller 22 may deliver, to the first and second DMD modules 31 and 32 through the interface 21, a control command to generate a dark area in a beam pattern or to perform an initialization operation on the first and second DMD modules 31 and 32 before the road surface information is implemented using the beam pattern.

At this time, when providing the control command to perform an initialization operation on the first and second DMD modules 31 and 32, the image controller 22 may perform an operation of identifying a DMD operation driver and an I2C communication response.

Furthermore, the image controller 22 needs to arbitrarily adjust the brightness of the light source included in the first and second DMD modules 31 and 32, needs to minimize power consumption by cutting off the power of the light source in daytime situations, and needs to turn on/off a fan.

When a dark area generating condition is satisfied, the image controller 22 may provide the first image generator 23 with the control command to generate a dark area and the data obtained from the vehicle sensor 10.

When the road surface information implementing condition is satisfied, the image controller 22 may provide the second image generator 23 with the control command to implement road surface information and the pieces of data obtained from the vehicle sensor 10.

Also, when both the dark area generating condition and the road surface information implementing condition are satisfied, the image controller 22 may provide the first and second image generators 22 and 23 with the control command to generate a dark area and to implement road surface information and the pieces of data obtained from the vehicle sensor 10.

When receiving the control command to generate a dark area from the image controller 22, the first image generator 23 may analyze control parameters of the pieces of data obtained from the vehicle sensor 10.

For example, the first image generator 23 may analyze an object based on the data obtained from the vehicle sensor 10.

The first image generator 23 may analyze and remove noise for the analyzed control parameters (e.g., the object analyzed as a forward vehicle), may generate coordinates for generating a dark area, and may perform coordinate transformation for applying the generated coordinates to the first and second DMD modules 31 and 32.

When the coordinate transformation for the dark area is completed, the first image generator 23 may optimize the dark area depending on the size and distance to the object (a forward vehicle).

The first image generator 23 may generate the optimized dark area as the dark image.

Afterward, the first image generator 23 may provide the generated dark image to the interface 21, thereby allowing the dark area to be generated in the beam pattern by the first and second DMD modules 31 and 32.

Moreover, the first image generator 23 may generate a single image by integrating the generated dark image and the road surface information image provided from the second image generator 24, and may provide the integrated single image to the interface 21, thereby allowing the first and second DMD modules 31 and 32 to implement the road surface information on a road surface.

When receiving the control command to implement the road surface information from the image controller 22, the second image generator 24 may select road surface information to be implemented by analyzing the control parameters of the pieces of data obtained from the vehicle sensor 10.

The second image generator 24 may calculate coordinates for a projection area of road surface information to be implemented, and may perform scaling (image quality improvement) on the road surface information to be implemented, based on the calculated coordinates.

The second image generator 24 may correct the distortion of the scaled image, may generate a road surface information image, and may provide the road surface information image to the first image generator 23.

Figure 5:
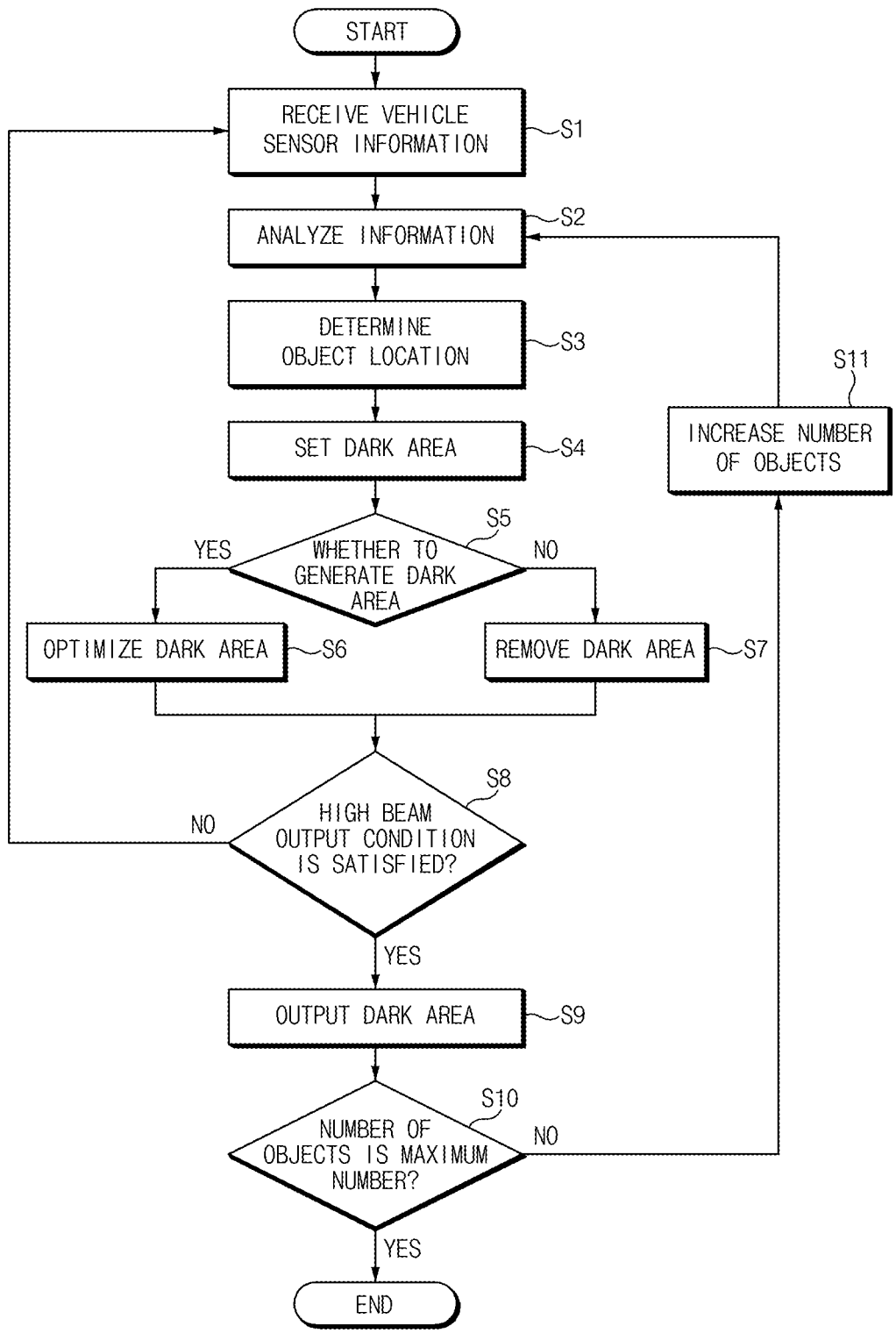
FIGS. 5 to 7 illustrate flowcharts for describing an operation of a head lamp system for a vehicle according to an embodiment of the present disclosure.
Figure 6:
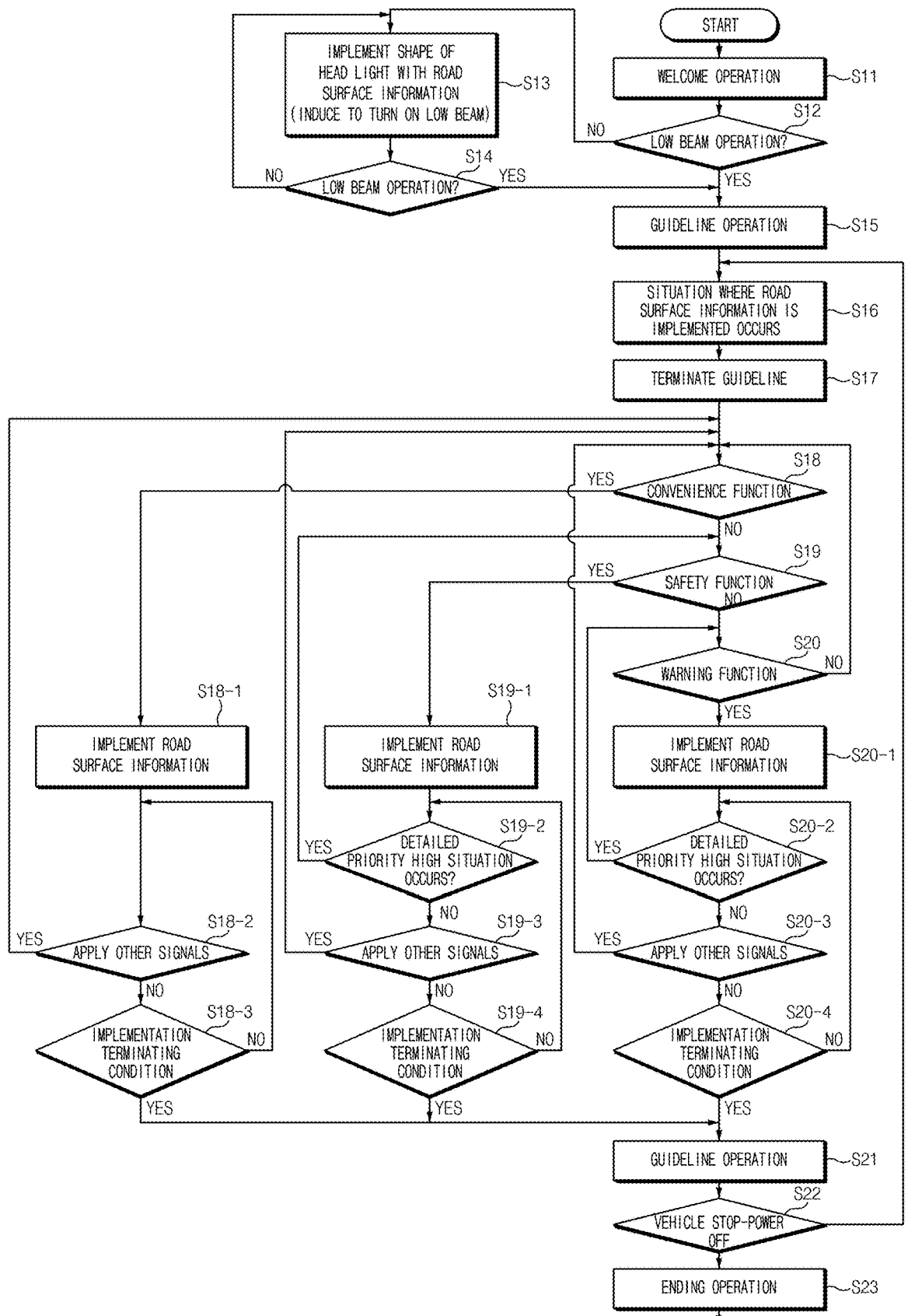
Figure 7:
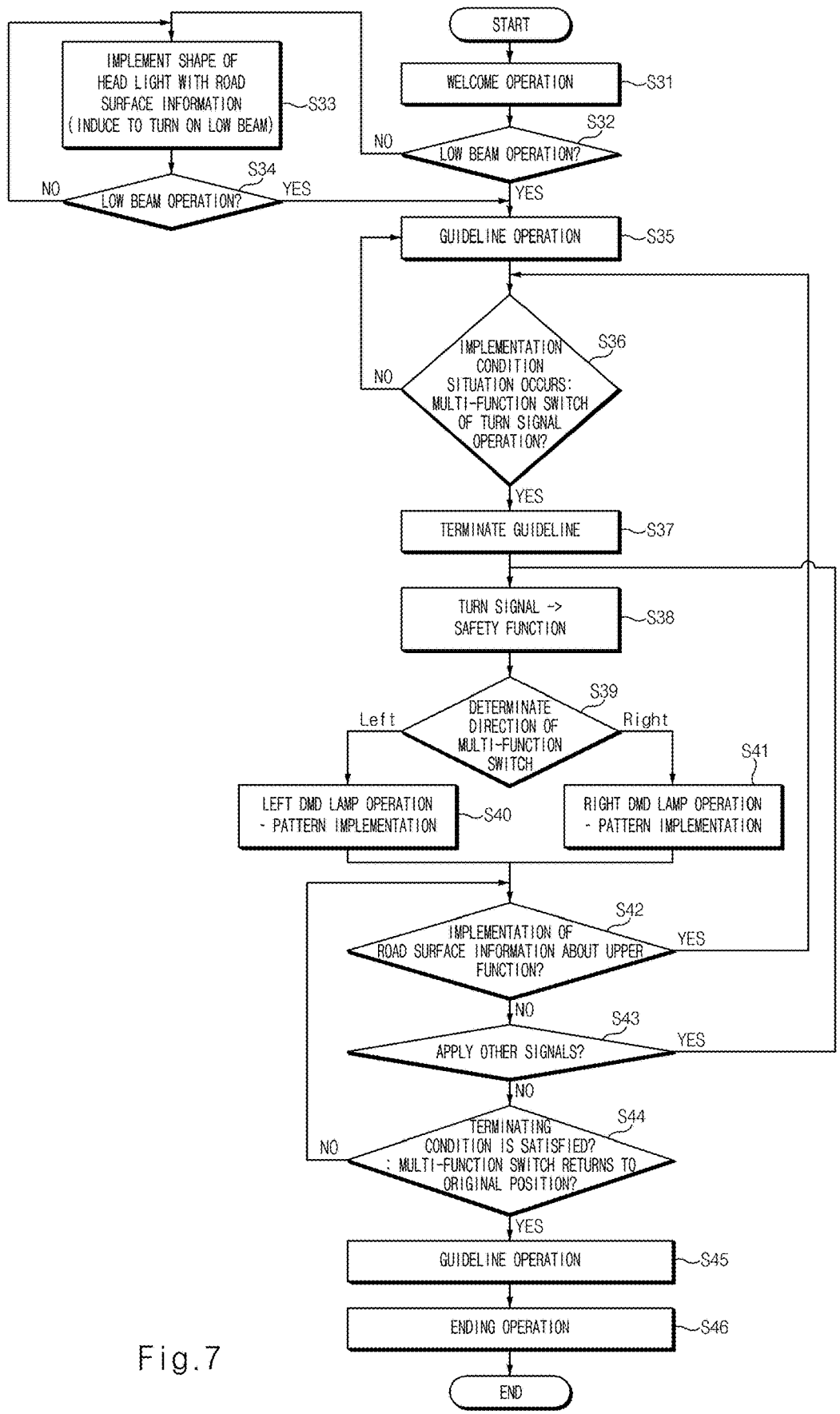

FIGS. 5 to 7 illustrate flowcharts for describing an operation of a head lamp system for a vehicle according to an embodiment of the present disclosure.

FIG. 5 is a flowchart illustrating an operation of generating a dark area among operations of a head lamp system for a vehicle according to an embodiment of the present disclosure.

Referring to FIG. 5, an operating method of generating a dark area of a head lamp system for a vehicle according to an embodiment of the present disclosure may include a vehicle sensor information receiving step S1, an information analyzing step S2, an object location determining step S3, a dark area setting step S4, a step S5 of determining whether to generate a dark area, a dark area optimizing step S6, a dark area removing step S7, a high beam output condition determining step S8, a dark area outputting step S9, a step S10 of determining the number of objects, and a step S11 of increasing the number of objects.

The vehicle sensor information receiving step S1 may include a step of receiving signals provided from the vehicle sensor 10.

For example, the vehicle sensor information receiving step S1 may include a step of receiving signals including information about the driving of a vehicle, such as a camera, an ADAS sensor, navigation, a steering wheel sensor, a multi-function switch, and weather sensor, as a step of receiving the detection results of sensors installed in the vehicle.

The information analyzing step S2 may include a step of determining an object by analyzing pieces of information received from the vehicle sensor 10.

For example, the information analyzing step S2 may include a step of determining an object that may cause glare of the counterpart due to high beams.

At this time, the information analyzing step S2 may determine the preset number (e.g., one) of objects.

The object location determining step S3 may include a step of determining the location of the object determined in the information analyzing step S2.

The dark area setting step S4 may include a step of setting a dark area corresponding to the location of the object.

At this time, because using the rotation of a micro-mirror, the head lamp system for a vehicle according to an embodiment of the present disclosure may control up to the horizontal angle of the dark area. Accordingly, the head lamp system for a vehicle may generate the small dark area as compared with the prior art. For this reason, in addition to improving a driver's visibility, the glare of the counterpart may be prevented as much as possible.

The step S5 of determining whether to generate a dark area may be that a driver presets whether the dark area is included in a high beam. When the driver sets the high beam to include the dark area (Yes), the dark area optimizing step S6 may be performed. When the driver sets the high beam not to include the dark area (No), the dark area removing step S7 may be performed.

The dark area optimizing step S6 may adjust the size of the dark area depending on the distance and size of the object, as a step of setting the margin of the dark area.

The dark area removing step S7 may include a step of removing the dark area set in the dark area setting step S4.

After one of the dark area optimizing step S6 and the dark area removing step S7 is performed, the high beam output condition determining step S8 may be performed.

When surroundings of the vehicle are dark and the vehicle's speed is not less than a preset speed (e.g., 40 km/h) in a state where the driver set to use a high beam, it may be determined in the high beam output condition determining step S8 that the high beam output condition is satisfied (Yes).

When it is determined in the high beam output condition determining step S8 that the high beam output condition is satisfied (Yes), a dark area outputting step S9 may be performed.

Meanwhile, when the driver does not set to use the high beam, when surroundings of the vehicle are bright, or when the vehicle's speed is less than the preset speed, it may be determined in the high beam output condition determining step S8 that the high beam output condition is not satisfied (No).

When it is determined in the high beam output condition determining step S8 that the high beam output condition is not satisfied (No), the method may return to the vehicle sensor information receiving step S1.

The dark area outputting step S9 may include a step of generating the dark area optimized in the dark area optimization step S6, in an area where the high beam is emitted, upon outputting a high beam.

After the dark area is output, the step S10 of determining the number of objects may be performed.

For example, the step S10 of determining the number of objects may include a step of determining whether the number of objects currently used to generate a dark area is the maximum number.

When the number of objects currently used to generate a dark area is not the maximum number in the step S10 of determining the number of objects (No), the step S11 of increasing the number of objects may be performed.

In the meantime, when the number of objects currently used to generate the dark area is the maximum number in the step S10 of determining the number of objects (Yes), the end step may be performed.

The step S11 of increasing the number of objects may include a step of increasing the number of objects determined in the information analyzing step S2 by a predetermined number (e.g., one).

The head lamp system for a vehicle according to an embodiment of the present disclosure illustrated in FIG. 5 may set the dark area for the preset number of objects based on signals provided by the vehicle sensor 10 and may output the high beam after including the dark area set in the high beam area. Also, when the number of objects that form the currently output dark area is not the set maximum number, the dark area may be set by analyzing the number of objects greater than the number of determined objects, and then a high beam including a dark area may be emitted.

FIG. 6 is a flowchart illustrating an operation of implementing road surface information on a road surface among operations of a head lamp system for a vehicle according to an embodiment of the present disclosure.

Referring to FIG. 6, a method of implementing road surface information of a head lamp system for a vehicle according to an embodiment of the present disclosure is as follows.

When a vehicle is started, a welcome operation may be performed (S11).

At this time, the welcome operation may be an operation in which the folded side mirror is opened and the lighting of a handle is turned on when the vehicle is started, and then interior lighting, mood lighting, or the like is turned on when the door of the vehicle is opened.

After the welcome operation is performed, whether a low beam operation is performed may be checked (S12).

When the low beam is not operated (No), the shape of the head light may be implemented with road surface information to induce a driver to turn on the low beam (S13).

After the turning-on of the low beam is induced, when the low beam is not operated by again checking whether the low beam is operated, the low beam may be continuously induced to be turned on (S14).

In the meantime, when the low beam is operated (Yes), a guideline may be allowed to be implemented as road surface information (S15).

For example, the driving direction of a vehicle may be allowed to be implemented (a guideline) as road surface information depending on the direction of a steering wheel At this time, after a vehicle is started and then whether a low beam operation is performed is checked, the implementation of the guideline as road surface information may be an operation performed by default.

In addition to the guideline, a situation where other road surface information needs to be implemented may occur (S16).

In this case, whether a condition for implementing road surface information is satisfied may be determined based on signals provided from the vehicle sensors 10, and then whether to implement the road surface information may be determined.

In addition, when it is determined that the road surface information needs to be implemented, the implementation of the guideline may be terminated (S17).

When the implementation of the guideline is terminated, one of pieces of road surface information such as convenience, safety, warning, and the like may be selected depending on road surface information implementing situations, and an image to be implemented on a road surface may be selected and implemented depending on weights of the selected road surface information. (S18, S18-1, S18-2, S18-3, S19, S19-1, S19-2, S19-3, S19-4, S20, S20-1, S20-2, S20-3, S20-4)

Table 1 below may indicate an example of the type and implementation condition of road surface information.

TABLE 1

| Primary classification | Road surface information | Weight | Detailed weight | Implementation condition | Termination condition |
|---|---|---|---|---|---|
| Convenience | Ice warning | 1 | 1 | Weather information (when temperature decreases below zero) | Automatic termination after implementation of specific number of times |
| Convenience | Speed bump | 1 | 1 | Inputting navigation information | Stopping receiving navigation information |
| Safety | Turn signal | 2 | 1 | Multi-function switch operation | Multi-function switch default location or steering angle change |
| Safety | Spot light | 2 | 2 | Recognition of Forward obstacles/ Pedestrian/ bicycle | Passing obstacles |
| Warning | BSD | 3 | 1 | BSD operating condition | BSD release condition |
| Warning | Lane Departure Warning | 3 | 2 | LDWS operating condition | LDWS release condition |
| Warning | AEB-Attention ahead | 3 | 3 | Recognition of forward vehicle/ vehicle speed/distance analysis | Deceleration/ Brake operation/ Increase of distance between vehicles |
| Warning | AEB-Collision Caution | 3 | 4 | Recognition of forward vehicle/ vehicle speed/distance analysis | Deceleration/ Brake operation/ Increase of distance between vehicles |

The abbreviations used in Table 1 are as follows.
Blind Spot Detection (BSD): BSD system
Lane Departure Warning System (LDWS): LDWS
Autonomous Emergency Braking (AEB): Emergency braking assistance system An operation that selects one of pieces of road surface information such as convenience, safety, warning, and the like depending on road surface information implementing situations, and selects and implements an image to be implemented on a road surface depending on the weight of the selected road surface information when the implementation of road surface information for the guideline is terminated will be described in more detail as follows.

When the implementation of road surface information for the guideline is terminated, whether to implement a driver's convenience function with road surface information may be determined depending on road surface information implementing situations (S18).

When it is determined that the driver's convenience function needs to be implemented with road surface information (Yes), an image of the road surface information according to the driver's convenience function may be implemented on a road surface (S18-1).

At this time, as illustrated in Table 1, the implementation priority of road surface information according to the driver's convenience function may be determined depending on weights and detailed weights.

In the meantime, when it is determined that the driver's convenience function does not need to be implemented with road surface information (No), whether to implement a safety function with the road surface information may be determined (S19).

In a state where an image for road surface information is implemented on the road surface, whether other signals different from other signals (i.e., signals for determining the driver's convenience function) are applied from the vehicle sensor 10 may be determined (S18-2).

When the other signals different from other signals (i.e., signals for determining the implementation of road surface information about the driver's convenience function) are applied from the vehicle sensor 10 (Yes), whether the road surface information about the driver's convenience function needs to be implemented may be determined again.

In the meantime, when the other signals are not applied from the vehicle sensor 10 (No), until a road surface information implementation terminating condition for the driver's convenience function is satisfied, the road surface information about the driver's convenience function may be implemented on a road surface (S18-3).

When the road surface information implementation terminating condition for the driver's convenience function is satisfied (Yes), the road surface information about a guideline may be implemented (S21).

Also, when it is determined that the driver's convenience function does not need to be implemented with the road surface information, whether to need to implement a safety function with the road surface information may be determined (S19).

When it is determined that the safety function needs to be implemented with the road surface information (Yes), an image of the road surface information according to the safety function may be implemented on a road surface (S19-1).

At this time, as illustrated in Table 1, the implementation priority of road surface information according to the safety function may be determined depending on weights and detailed weights.

When a high priority situation according to the safety function occurs depending on weights and detailed weights (Yes), the implementation priority of the road surface information according to the safety function may be determined to set the image to be implemented on a road surface again in the safety function (S19-2).

In a state where the road surface information about the safety function is implemented, whether the other signals different from other signals for determining the safety function are applied from the vehicle sensor 10 may be determined (S19-3).

When the other signals are applied from the vehicle sensors 10 (Yes), whether the road surface information about the driver's convenience function needs to be implemented may be determined again (S19-2).

In the meantime, when the other signals are not applied from the vehicle sensor 10 (No), until a road surface information implementation terminating condition for the safety function is satisfied, the road surface information about the safety function may be implemented on a road surface (S19-4).

When the road surface information implementation terminating condition for the safety function is satisfied (Yes), the road surface information about the guideline may be implemented (S21).

In the meantime, when it is determined that the safety function does not need to be implemented with the road surface information (No), whether to implement a warning function with the road surface information may be determined (S20).

When it is determined that the warning function needs to be implemented with the road surface information (Yes), an image of the road surface information according to the warning function may be implemented on a road surface (S20-1).

At this time, as illustrated in Table 1, the implementation priority of road surface information according to the warning function may be determined depending on weights and detailed weights.

When a high priority situation according to the warning function occurs depending on weights and detailed weights (Yes), the implementation priority of the road surface information according to the warning function may be determined to set the image to be implemented on a road surface again in the warning function (S20-2).

In a state where the road surface information about the warning function is implemented, whether the other signals different from other signals for determining the warning function are applied from the vehicle sensor 10 may be determined (S20-3).

When the other signals are applied from the vehicle sensor 10 (Yes), whether the road surface information about the warning function needs to be implemented may be determined again (S20-2).

In the meantime, when the other signals are not applied from the vehicle sensor 10 (No), until a road surface information implementation terminating condition for the warning function is satisfied, the road surface information about the warning function may be implemented on a road surface (S20-4).

When the road surface information implementation terminating condition for the warning function is satisfied (Yes), the road surface information about the guideline may be implemented (S21).

Afterward, depending on whether the vehicle is started or not, whether a situation in which other road surface information other than the guideline needs to be implemented occurs may be detected again, or whether a road surface information implementation operation needs to be terminated may be selected (S22).

When the ignition of the vehicle is turned off, all operations of implementing road surface information may be terminated (S23).

In the meantime, when the ignition of the vehicle is maintained (No), it may be determined again whether other road surface information other than the guideline needs to be implemented.

As described above, the head lamp system for a vehicle according to an embodiment of the present disclosure may select road surface information according to a predetermined priority based on signals provided from the vehicle sensor 10, and may implement the selected road surface information on a road surface.

FIG. 7 is a flowchart illustrating an operation of implementing road surface information on a road surface among operations of a head lamp system for a vehicle according to an embodiment of the present disclosure.

FIG. 7 is a flowchart illustrating an operation for regarding a driving direction (e.g., a turn signal) among operations of a head lamp system for a vehicle according to an embodiment of the present disclosure.

Referring to FIG. 7, a method of implementing road surface information of a head lamp system for a vehicle according to an embodiment of the present disclosure is as follows.

When a vehicle is started, a welcome operation may be performed (S31).

At this time, the welcome operation may be an operation in which the folded side mirror is opened and the lighting of a handle is turned on when the vehicle is started, and then interior lighting, mood lighting, or the like is turned on when the door of the vehicle is opened.

After the welcome operation is performed, whether a low beam operation is performed may be checked (S32).

When the low beam is not operated (No), the shape of the head light may be implemented with road surface information to induce a driver to turn on the low beam (S33).

After the turning-on of the low beam is induced, when the low beam is not operated by again checking whether the low beam is operated, the low beam may be continuously induced to be turned on (S34).

In the meantime, when the low beam is operated (Yes), a guideline may be allowed to be implemented as road surface information (S35).

For example, the driving direction of a vehicle may be allowed to be implemented (a guideline) as road surface information depending on the direction of a steering wheel At this time, after a vehicle is started and then whether a low beam operation is performed is checked, the implementation of the guideline as road surface information may be an operation performed by default.

In addition to the guideline, a situation where other road surface information needs to be implemented may occur (S36).

In this case, whether a condition for implementing road surface information is satisfied may be determined based on signals provided from the vehicle sensors 10, and then whether to implement the road surface information may be determined.

For example, whether a multi-function switch, for example, a turn signal is operated may be determined, and then whether to implement the road surface information may be determined.

Besides, when it is determined that driving direction information, that is, road surface information about the operation of a turn signal needs to be implemented, the implementation of the guideline may be terminated (S37).

When the implementation of the guideline is terminated, the safety function among pieces of road surface information such as convenience, safety, warning, and the like may be selected depending on road surface information implementing situations, and an image to be implemented on a road surface may be selected and implemented depending on the driving direction according to the operation of the turn signal in the selected safety function. (S38, S39, S40, S41, S42, S43, S44)

The operation of selecting and implementing the direction indication image for the safety function depending on road surface information implementation situations (an operation of a turn signal) when the implementation of road surface information about the guideline is terminated (S37) will be described in more detail as follows.

When the implementation of road surface information about the guideline is terminated (S37), the safety function may be selected among road surface information depending on whether the turn signal is operated (S38).

When the safety function is selected, the direction indicated by the turn signal may be determined (S39).

When the turn signal indicates the left side, an image for the left direction may be implemented on a road surface by operating the DMD module placed on the left side of a vehicle (S40).

In the meantime, when the turn signal indicates the right side, an image for the right direction may be implemented on a road surface by operating the DMD module placed on the right side of a vehicle (S41).

In a state where the image for the road surface information according to the driving direction is implemented on a road surface, whether a situation of implementing the road surface information about a function (weight determination) higher than the safety function occurs may be determined (S42).

When the implementation situation of the road surface information about a function higher than the safety function occurs (Yes), whether a road surface information implementing condition is satisfied may be determined again.

In the meantime, when the implementation situation of the road surface information about a function higher than the safety function does not occur (No), whether other signals, that is, different direction signals are applied from the multi-function switch (S43).

When a signal different from the road surface information about the currently implemented driving direction is applied (Yes), whether to need to implement the road surface information about other driving directions may be determined again.

In the meantime, when the other signal is not applied from the multi-function switch (No), until a road surface information implementation terminating condition for the safety function is satisfied, the road surface information about driving directions according to the safety function may be implemented on a road surface (S44).

When the road surface information implementation terminating condition according to driving directions of the safety function is satisfied (Yes), the road surface information about the guideline may be implemented (S45).

When the ignition of the vehicle is turned off, all operations of implementing road surface information may be terminated (S46).

As described above, the head lamp system for a vehicle according to an embodiment of the present disclosure may increase or decrease the size of a dark area horizontally and vertically by controlling each micro-mirror using a DMD module, and thus may optimize the dark area in high beam emission situations.

Besides, the head lamp system for a vehicle according to an embodiment of the present disclosure may implement road surface information according to driving situations on a road surface by controlling each micro-mirror using the DMD module.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

This technology may improve a driver's visibility by minimizing a dark area and may reduce the glare of other drivers.

Besides, this technology may improve convenience and safety through communication with users (a counterpart driver, pedestrian, bicycle, or the like) on a road by implementing an image on a road surface.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A head lamp system for a vehicle, the system comprising:
    a vehicle sensor configured to detect driving situations of a vehicle;
    a first Digital Micro mirror Device (DMD) module and a second DMD module that include a plurality of micro-mirrors, wherein each of the first and second DMD modules includes:
        a light source configured to emit light;
        the plurality of micro-mirrors for reflecting the emitted light from the light source; and
        an optical system that receives light reflected from the plurality of micro-mirrors to generate a light distribution pattern;
        wherein each of the plurality of micro-mirrors forms the light distribution pattern by rotating to reflect the light emitted from the light source to the optical system, under control of the module controller, or generates a dark area by rotating not to enter the light emitted from the light source into the optical system; and
    a module controller configured to control the plurality of micro-mirrors included in the first and second DMD modules based on signals provided from the vehicle sensor, wherein the module controller:

controls some of the plurality of micro-mirrors to reflect light to the optical system;

controls the remaining plurality of micro-mirrors not to reflect light;

changes a size of the dark area included in a high beam by increasing or decreasing the number of micro-mirrors, which do not reflect light to the optical system, from among the plurality of micro-mirrors; and changes a horizontal size of the dark area by increasing or decreasing the number of micro-mirrors in a horizontal direction, which do not reflect light to the optical system, from among the plurality of micro-mirrors.

2. The system of claim 1, wherein the module controller changes a vertical size of the dark area by increasing or decreasing the number of micro-mirrors in a vertical direction, which do not reflect light to the optical system, from among the plurality of micro-mirrors.

3. The system of claim 1, wherein the module controller selects road surface information according to the driving situations based on the signals provided from the vehicle sensor, and controls the first and second DMD modules to implement an image according to the selected road surface information on a road surface.

4. The system of claim 3, wherein the module controller controls only a micro-mirror of a location corresponding to an image to be implemented on the road surface among the plurality of micro-mirrors such that light reflected to the optical system is input, controls the remaining micro-mirrors such that the light reflected to the optical system is not input, and implements an image of the road surface information on the road surface.

5. The system of claim 3, wherein the module controller sets a priority according to a predetermined weight based on the signals provided from the vehicle sensor, and selects the road surface information depending on the set priority.

6. A head lamp system for a vehicle, the system comprising:

a vehicle sensor configured to detect driving situations of a vehicle;

a first Digital Micro mirror Device (DMD) module and a second DMD module that include a plurality of micro-mirrors, wherein each of the first and second DMD modules includes:

a light source configured to emit light;

the plurality of micro-mirrors for reflecting the emitted light from the light source; and an optical system that receives light reflected from the plurality of micro-mirrors to generate a light distribution pattern;

wherein each of the plurality of micro-mirrors forms the light distribution pattern by rotating to reflect the light emitted from the light source to the optical system, under control of the module controller, or generates a dark area by rotating not to enter the light emitted from the light source into the optical system; and a module controller configured to control the plurality of micro-mirrors included in the first and second DMD modules based on signals provided from the vehicle sensor, wherein the module controller:

controls some of the plurality of micro-mirrors to reflect light to the optical system;

controls the remaining plurality of micro-mirrors not to reflect light;

changes a size of the dark area included in a high beam by increasing or decreasing the number of micro-mirrors, which do not reflect light to the optical system, from among the plurality of micro-mirrors; and changes a vertical size of the dark area by increasing or decreasing the number of micro-mirrors in a vertical direction, which do not reflect light to the optical system, from among the plurality of micro-mirrors.

7. A head lamp system for a vehicle, the system comprising:

a vehicle sensor configured to detect driving situations of a vehicle;

a first Digital Micro mirror Device (DMD) module and a second DMD module that include a plurality of micro-mirrors, wherein each of the first and second DMD modules includes:

a light source configured to emit light;

the plurality of micro-mirrors for reflecting the emitted light from the light source; and an optical system that receives light reflected from the plurality of micro-mirrors to generate a light distribution pattern;

wherein each of the plurality of micro-mirrors forms the light distribution pattern by rotating to reflect the light emitted from the light source to the optical system, under control of the module controller, or generates a dark area by rotating not to enter the light emitted from the light source into the optical system; and a module controller configured to control the plurality of micro-mirrors included in the first and second DMD modules based on signals provided from the vehicle sensor, wherein the module controller:

selects road surface information according to the driving situations based on the signals provided from the vehicle sensor;

controls the first and second DMD modules to implement an image according to the selected road surface information on a road surface sets a priority according to a predetermined weight based on the signals provided from the vehicle sensor; and selects the road surface information depending on the set priority.

\* \* \* \* \*